US011999127B2

(12) United States Patent
Peng et al.

(10) Patent No.: US 11,999,127 B2
(45) Date of Patent: Jun. 4, 2024

(54) AUTOMATIC PACKAGING BAG PRODUCTION DEVICE AND METHOD

(71) Applicant: Anqing HENG CHANG Machinery Co., Ltd., Anqing (CN)

(72) Inventors: Xianfeng Peng, Anqing (CN); Fenglin Jiang, Anqing (CN); Zhaorong Lv, Anqing (CN); Ziheng Lv, Anqing (CN); Xiang Ma, Anqing (CN)

(73) Assignee: ANQING HENG CHANG MACHINERY CO., LTD., Anqing (CN)

( * ) Notice: Subject to any disclaimer, the term of this patent is extended or adjusted under 35 U.S.C. 154(b) by 0 days.

(21) Appl. No.: 18/509,348

(22) Filed: Nov. 15, 2023

(65) Prior Publication Data

US 2024/0083132 A1 Mar. 14, 2024

Related U.S. Application Data

(63) Continuation of application No. PCT/CN2023/095286, filed on May 19, 2023.

(30) Foreign Application Priority Data

Jul. 20, 2022 (CN) ......................... 202210862081.0

(51) Int. Cl.
*B31B 70/00* (2017.01)
*B31B 70/02* (2017.01)
(Continued)

(52) U.S. Cl.
CPC .............. *B31B 70/25* (2017.08); *B31B 70/02* (2017.08); *B31B 70/142* (2017.08); *B31B 70/642* (2017.08)

(58) Field of Classification Search
CPC ....... B31B 70/25; B31B 70/642; B31B 70/02; B31B 70/142
(Continued)

(56) References Cited

U.S. PATENT DOCUMENTS 3,834,287 A * 9/1974 Hollis ..................... B31B 50/00 493/317
4,534,158 A * 8/1985 McClosky ................ B65B 1/02 53/562
(Continued)

FOREIGN PATENT DOCUMENTS

CN 203844299 U 9/2014
CN 204773802 U 11/2015
(Continued)

*Primary Examiner* — Jacob A Smith
(74) *Attorney, Agent, or Firm* — Bayramoglu Law Offices LLC

(57) ABSTRACT

An automatic packaging bag production device is provided. The automatic packaging bag production device includes an easy-tear line forming mechanism, a sealing and cutting mechanism, a tray, and a traction mechanism, where the easy-tear line forming mechanism includes a first passage and is configured to form an easy-tear line on a belt-shaped material passing through the first passage; the sealing and cutting mechanism includes a second base plate, and a cutting assembly and a sealing assembly arranged on the second base plate; the cutting assembly includes an upper cutter and a lower cutter that are movable close to or away from each other and a second passage is formed between the upper cutter and the lower cutter; the sealing assembly includes an upper sealer and a lower sealer, and a third passage is formed between the upper sealer and the lower sealer.

20 Claims, 5 Drawing Sheets

(51) Int. Cl.
*B31B 70/14* (2017.01)
*B31B 70/64* (2017.01)

(58) Field of Classification Search
USPC .......................................................... 493/240
See application file for complete search history.

(56) References Cited

U.S. PATENT DOCUMENTS

| | | | | |
|---|---|---|---|---|
| 8,424,859 | B2 * | 4/2013 | Ishikawa .................. | B31F 1/08 270/32 |
| 2008/0022637 | A1 * | 1/2008 | Buchko ................ | B65B 31/024 53/433 |
| 2008/0127612 | A1 * | 6/2008 | Ishii ........................ | B65B 57/12 53/375.5 |
| 2011/0023413 | A1 * | 2/2011 | Suzuki ................. | B65B 25/061 53/131.5 |

FOREIGN PATENT DOCUMENTS

| | | | | |
|---|---|---|---|---|
| CN | 205736179 | U | 11/2016 | |
| CN | 207359728 | * | 5/2018 | ............. B31B 70/20 |
| CN | 207359728 | U | 5/2018 | |
| CN | 113878933 | A | 1/2022 | |
| CN | 215435265 | U | 1/2022 | |
| CN | 218463122 | U | 2/2023 | |
| JP | 2008080802 | A | 4/2008 | |

* cited by examiner

AUTOMATIC PACKAGING BAG PRODUCTION DEVICE AND METHOD

CROSS REFERENCE TO THE RELATED APPLICATIONS

This application is a continuation application of International Application No. PCT/CN2023/095286, filed on May 19, 2023, which is based upon and claims priority to Chinese Patent Application No. 202210862081.0, filed on Jul. 20, 2022, the entire contents of which are incorporated herein by reference.

TECHNICAL FIELD

The present disclosure belongs to the technical field of sanitary product packaging equipment, and in particular to an automatic packaging bag production device and method.

BACKGROUND

At present, the packaging equipment for a disposable sanitary product on the market includes mechanisms for packaging bag heat-sealing, hot-cutting, and easy-tear line forming, and specifically includes a sealing mechanism, a tension adjustment mechanism, an easy-tear line forming mechanism, a traction mechanism, and a cutting mechanism. These mechanisms perform a sequence of operations to form a belt-shaped material into a packaging bag. The sealing mechanism performs tail sealing, the tension adjustment mechanism adjusts tension of the belt-shaped material, the easy-tear line forming mechanism makes an easy-tear line, and the traction mechanism pulls the belt-shaped material. Finally, the cutting mechanism cuts the belt-shaped material to finish the online production of the packaging bag. The processes of sealing, easy-tear line making, and cutting have always been troubled by breakage of the belt-shaped material, which can cause system shutdown and cause significant losses. Especially, an increase in the breakage probability of the belt-shaped material is found in the use of high-speed packaging equipment and belt-shaped low-weight plastic film material. The major reason for the breakage of the belt-shaped material has always been attributed to the pulling of the traction mechanism. Indeed, some results have been achieved by improving the traction mechanism, such as adding a tension adjustment mechanism. However, not all of the improvement measures are effective, and the breakage problem still exists. In addition, in the existing solution, in order to accommodate packaging bags of different specifications, the distance between each of the two adjacent mechanisms is relatively large, resulting in a large space occupied by the entire equipment.

SUMMARY

To solve the problem that the belt-shaped material is prone to breakage during the production process of packaging bags in the prior art, the present disclosure provides an automatic packaging bag production device and method.

A core of the present disclosure is to explore another reason why the belt-shaped material is prone to breakage during the production process of packaging bags. Specifically, during the production process of packaging bags, the sealing operation is firstly performed, which causes the shrinkage of the low-weight plastic film material. Due to the change in tension, the belt-shaped low-weight plastic film material is prone to breakage.

To solve the above technical problem, the present disclosure adopts the following technical solutions. An automatic packaging bag production device includes:

- an easy-tear line forming mechanism, including a first passage, and configured to form an easy-tear line on a belt-shaped material passing through the first passage;
- a sealing and cutting mechanism, including a second base plate, and a cutting assembly and a sealing assembly arranged on the second base plate, where the cutting assembly includes an upper cutter and a lower cutter; a second passage is formed between the upper cutter and the lower cutter, and the upper cutter and the lower cutter are driven by a third driving element to move close to or away from each other; the sealing assembly includes an upper sealer and a lower sealer; and a third passage is formed between the upper sealer and the lower sealer, and the upper sealer and the lower sealer are driven by a fourth driving element to move close to or away from each other;
- a tray, where the first passage, the second passage, the third passage, and the tray are sequentially arranged; and
- a traction mechanism, configured to pull the belt-shaped material for a sequence of operations as follows: in the first passage, the easy-tear line forming mechanism forms the easy-tear line on the belt-shaped material; in the second passage, the upper cutter and the lower cutter move close to each other to cut a packaging bag, such that the packaging bag falls onto the tray; and in the third passage, the upper sealer and the lower sealer move close to each other to heat-seal a tail end of the packaging bag.

Preferably, the easy-tear line forming mechanism includes a first base plate, a pressure plate, a support plate, and a perforated cutter; the support plate is fixedly provided on the first base plate; the pressure plate is driven by a first driving element to move close to or away from the support plate; the first passage is formed between the pressure plate and the support plate; a perforation hole communicated with the first passage runs through the support plate; and the perforated cutter is driven by a second driving element to move into or away from the first passage through the perforation hole. The easy-tear line forming mechanism is structured simply and reliably, easy to implement, easy to control, and low-cost.

Further, the automatic packaging bag production device further includes a base; the base is provided with a guide rail; the first base plate and the second base plate are sequentially slidable along the guide rail; a first handle structure for locking the first base plate is provided between the first base plate and the guide rail; and a second handle structure for locking the second base plate is provided between the second base plate and the guide rail. When it is necessary to replace the specifications of the packaging bag, a distance between the mechanisms, that is, the easy-tear line forming mechanism and the sealing and cutting mechanism along the guide rail is adjusted such that these mechanisms are appropriately positioned. Then, they are locked by the first handle structure and the second handle structure. In this way, the specifications of the packaging bag are replaced, and different specifications of packaging bags can be accommodated.

Further, the base is provided with a ruler along the guide rail. When it is necessary to replace the specifications of the packaging hag, a distance between the mechanisms, that is, the easy-tear line forming mechanism and the sealing and cutting mechanism along the guide rail is adjusted such that these mechanisms are appropriately positioned. Then, they are locked by the first handle structure and the second handle structure. Finally, the corresponding position on the ruler is recorded for visual adjustment of the distance between the easy-tear line forming mechanism and the sealing and cutting mechanism. The design achieves efficient and precise adjustment, saving time for replacement.

Preferably, the traction mechanism includes a driving structure, multiple traction wheels, and multiple guide wheels; the driving structure is configured to drive the traction wheels to rotate; the multiple traction wheels are sequentially arranged along a conveying direction of the belt-shaped material; a compression wheel is provided at a side of each of the traction wheels; the belt-shaped material passes between the compression wheel and the traction wheel; the multiple guide wheels are sequentially arranged along the conveying direction of the belt-shaped material; and the guide wheels are configured to guide a conveying trajectory of the belt-shaped material. The automatic packaging bag production device compresses the belt-shaped material onto the traction wheel through the compression wheel, effectively preventing the material from slipping during the conveying process. The design improves the conveying accuracy of the belt-shaped material, and ensures the accuracy and success rate of packaging bag production. The automatic packaging bag production device reliably and stably guides the conveying trajectory of the belt-shaped material through the guide wheel, such that the belt-shaped material stably passes through the first passage, the second passage, the third passage, and the tray sequentially.

Further, the driving structure includes a driving wheel, a tensioning wheel, and a synchronous belt; the driving wheel, the tensioning wheel, and the traction wheels are in transmission connection with the synchronous belt; the driving wheel is driven by a servo motor; and the compression wheel is driven by a fifth driving element to move close to or away from the corresponding traction wheel. The automatic packaging bag production device adopts a simple and reliable driving structure, which can easily control the conveying speed of the belt-shaped material. The design adapts to different packaging speeds, and ensures simple maintenance. The fifth driving element facilitates the adjustment of a gap between the compression wheel and the traction wheel. After the belt-shaped material passes through the gap, the compression wheel presses the material onto the traction wheel to prevent the belt-shaped material from slipping during conveyance.

Further, the traction mechanism further includes a third base plate; the driving structure, the traction wheels, and the compression wheels are provided on the third base plate; the first base plate, the third base plate, and the second base plate are sequentially slidable along the guide rail; and a third handle structure for locking the third base plate is provided between the third base plate and the guide rail. When it is necessary to replace the specifications of the packaging bag, a distance between the mechanisms, that is, the easy-tear line forming mechanism, the traction mechanism, and the sealing and cutting mechanism along the guide rail is adjusted such that these mechanisms are appropriately positioned. Then, they are locked by the first handle structure, the third handle structure, and the second handle structure. In this way, the specifications of the packaging bag are replaced, and different specifications of packaging bags can be accommodated.

Further, the first passage, the second passage, and the third passage are located on a same horizontal line; and at least one pair of the traction wheel and the compression wheel is provided between the easy-tear line forming mechanism and the sealing and cutting mechanism. The design ensures the reliability and stability of easy-tear line perforation, cutting, and tail sealing operations.

An automatic packaging bag production method uses the automatic packaging bag production device according to any one of the above paragraphs, and includes the following steps:

S1: pulling, by the traction mechanism, the belt-shaped material to pass through the first passage, the second passage, the third passage, and the tray sequentially;

S2: driving, by the first driving element, the pressure plate to move close to the support plate to close the first passage and compress the belt-shaped material, when a perforation position of the belt-shaped material reaches the perforation hole; driving, by the second driving element, the perforated cutter to move into the first passage through the perforation hole to form the easy-tear line at the perforation position of the belt-shaped material; driving, by the second driving element, the perforated cutter to move away from the first passage through the perforation hole; and driving, by the first driving element, the pressure plate to move away from the support plate to open the first passage;

S3: continuously pulling, by the traction mechanism, the belt-shaped material; driving, by the third driving element, the upper cutter and the lower cutter to move close to each other to cut a tail end of the belt-shaped material, such that a set-size packaging bag falls onto the tray, with a tail end exposed; and driving, by the third driving element, the upper cutter and the lower cutter to move away from each other to open the second passage; and S4: driving, by the fourth driving element, the upper sealer and the lower sealer to move close to each other to heat-seal the tail end of the packaging bag; and driving, by the fourth driving element, the upper sealer and the lower sealer to move away from each other to open the third passage.

Preferably, the driving, by the second driving element, the perforated cutter to move into the first passage through the perforation hole in step S2 and the driving, by the third driving element, the upper cutter and the lower cutter to move close to each other to cut the tail end of the belt-shaped material in step S3 are performed simultaneously. The design greatly improves the automatic production efficiency of packaging bags.

The present disclosure has the following beneficial effects.

1. In the present disclosure, the automatic packaging bag production device positions the sealing assembly behind the cutting assembly, first cutting and then sealing. After the material is sealed, there is no need to continue pulling the material. That is, the last step is heat sealing. In this way, the automatic packaging bag production device does not need to consider changes in material tension, cleverly avoiding the problem of material breakage caused by tension changes after the plastic film material is heat-sealed.

2. In the present disclosure, the automatic packaging bag production device integrates the sealing assembly and the cutting assembly, making the entire automatic packaging bag production device compact and greatly reducing the occupied space.

3. In the present disclosure, when it is necessary to replace the specifications of the packaging bag, the automatic packaging bag production device adjusts the distance between the easy-tear line forming mechanism, the traction mechanism, and the sealing and cutting mechanism along the guide rail to position these mechanisms appropriately. Then, the automatic packaging bag production device locks the first handle structure, the third handle structure, and the second handle structure to achieve replacement of the specifications. The automatic packaging bag production device features convenient adjustment, saves replacement time, and accommodates packaging bags of different specifications.

4. In the present disclosure, the automatic packaging bag production device adopts a simple and reliable driving structure, which connects the synchronous belt through a servo motor to control the conveying speed of the belt-shaped material. The design adapts to different packaging speeds, and ensures simple maintenance.

5. In the present disclosure, the automatic packaging bag production device compresses the belt-shaped material onto the traction wheel through the compression wheel, effectively, preventing the material from slipping during the conveying process. The design improves the conveying accuracy of the belt-shaped material, and ensures the accuracy and success rate of packaging bag production. The automatic packaging bag production device reliably and stably, guides the conveying trajectory of the belt-shaped material through the guide wheel, such that the belt-shaped material stably passes through the first passage, the second passage, the third passage, and the tray sequentially.

BRIEF DESCRIPTION OF THE DRAWINGS

To describe the technical solutions in the embodiments of the present disclosure more clearly, the drawings required for the embodiments are briefly described below. Apparently, the drawings in the following description show merely some embodiments of the present disclosure, and a person of ordinary skill in the art may still derive other drawings from these drawings without creative efforts.

In FIG. 1, an arrow indicates a conveying direction of a belt-shaped material.

REFERENCE NUMERALS

Figure 1:
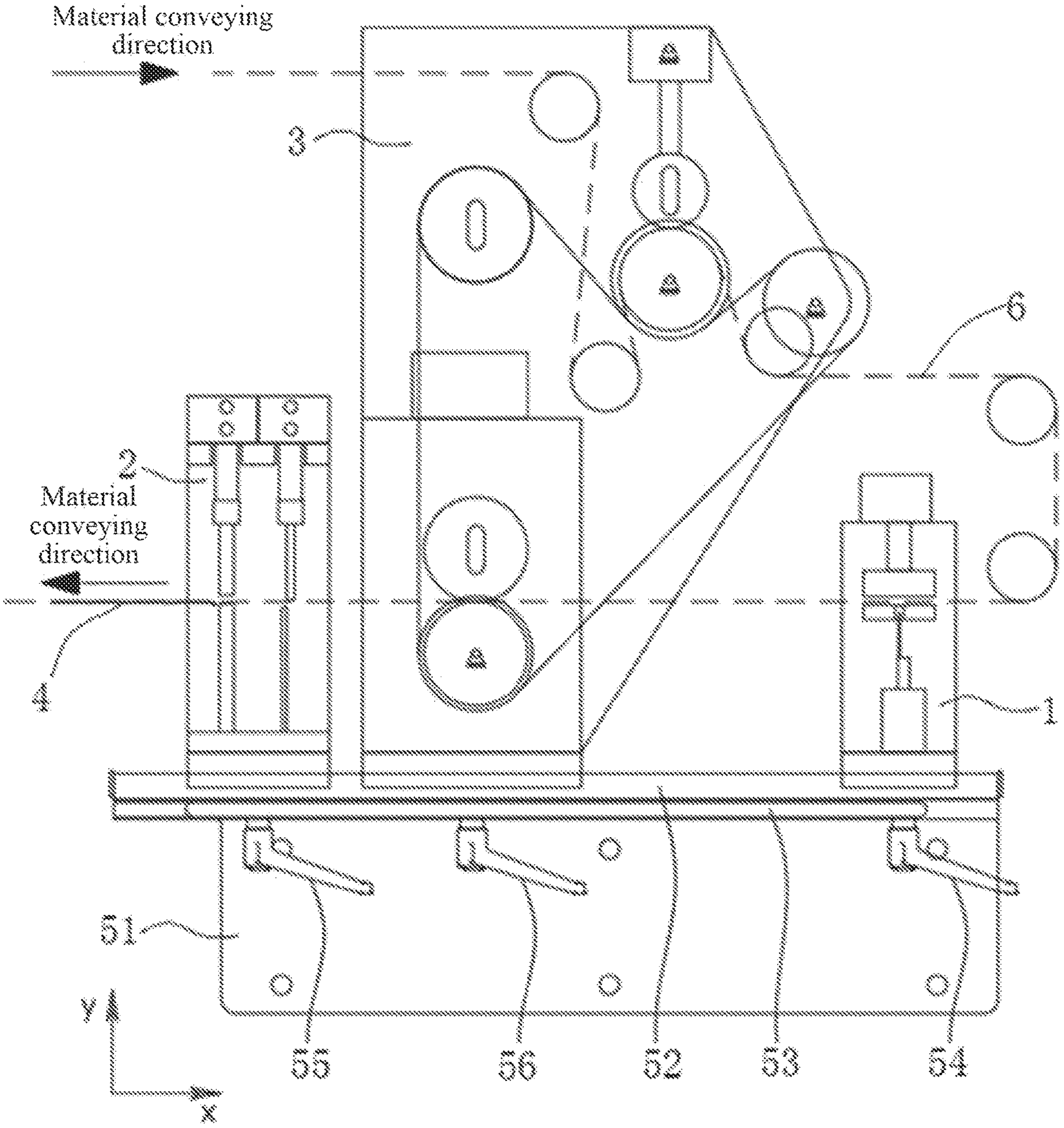
FIG. 1 is a front view of an automatic packaging bag production device according to the present disclosure.

1. easy-tear line forming mechanism; 11. first base plate; 12. pressure plate; 13. support plate; 131. perforation hole; 14. perforated cutter; 15. first driving element; 16. first passage; 17. second driving element; 2. sealing and cutting mechanism; 21. second base plate; 22. cutting assembly; 221. upper cutter; 222. lower cutter; 223. second passage; 224. third driving element; 23. sealing assembly; 231 upper sealer; 232. lower sealer; 233. third passage; 234, fourth driving element; 3, traction mechanism; 31, driving structure; 311. driving wheel; 312. tensioning wheel; 313. synchronous belt; 32. traction wheel; 33. compression wheel; 34. guide wheel; 35. fifth driving element; 36. third base plate; 4. tray; 51. base; 52. guide rail; 53. ruler; 54. first handle structure; 55. second handle structure; 56. third handle structure; and 6. belt-shaped material.

DETAILED DESCRIPTION OF THE EMBODIMENTS

The technical solutions of the embodiments of the present disclosure are clearly and completely described below with reference to the drawings in the embodiments of the present disclosure. Apparently, the described embodiments are merely a part rather than all of the embodiments of the present disclosure. The following description of at least one exemplary embodiment is merely illustrative, and not intended to limit the present disclosure and application or use thereof in any way. All other embodiments obtained by a person of ordinary skill in the art on the basis of the embodiments of the present disclosure without creative efforts shall fall within the protection scope of the present disclosure.

As shown in FIGS. 1 to 5, for ease of description, in an embodiment, an X-axis is established horizontally and a Y-axis is established vertically. An automatic packaging bag production device includes easy-tear line forming mechanism 1, sealing and cutting mechanism 2, tray 4, and traction mechanism 3. The easy-tear line forming mechanism 1 includes first base plate 11, pressure plate 12, support plate 13, and perforated cutter 14. The support plate 13 is fixedly provided on the first base plate 11. The pressure plate 12 is driven by first driving element 15 to move close to or away from the support plate 13 along the Y-axis. First passage 16 is formed between the pressure plate 12 and the support plate 13. Perforation hole 131 communicated with the first passage 16 runs through the support plate 13 along the Y-axis. The perforated cutter 14 is driven by second driving element 17 to move into or away from the first passage 16 through the perforation hole 131. When the belt-shaped material 6 passes through the first passage 16, the easy-tear line forming mechanism 1 forms an easy-tear line on the belt-shaped material. The sealing and cutting mechanism 2 includes second base plate 21, and cutting assembly 22 and sealing assembly 23 arranged on the second base plate 21. The cutting assembly 22 includes upper cutter 221 and lower cutter 222. Second passage 223 is formed between the upper cutter 221 and the lower cutter 222. The upper cutter 221 and the lower cutter 222 are driven by third driving element 224 to move close to or away from each other along the Y-axis. The sealing assembly 23 includes upper sealer 231 and lower sealer 232. Third passage 233 is formed between the upper sealer 231 and the lower sealer 232. The upper sealer 231 and lower sealer 232 are driven by fourth driving element 234 to move close to or away from each other along the Y-axis. The first passage 16, the second passage 223, the third passage 233, and the tray 4 are sequentially arranged. The tray 4 is configured to hold a packaging bag cut by the cutting assembly 22. In this embodiment, the tray 4 is movable along a conveying direction of the belt-shaped material 6 to convey the sealed packaging bag to a next process. The traction mechanism 3 is configured to pull the belt-shaped material 6 through the first passage 16, the second passage 223, the third passage 233, and the tray 4 sequentially. In this way, in the first passage 16, the easy-tear line forming mechanism 1 forms the easy-tear line on the belt-shaped material 6. In the second passage 223, the upper cutter 221 and the lower cutter 222 move close to each other to cut the packaging bag, such that the packaging bag falls onto the tray 4. In the third passage 233, the upper sealer 231 and the lower sealer 232 move close to each other to heat-seal a tail end of the packaging bag. In this embodiment, the belt-shaped material 6 is a belt-shaped plastic film material 6.

Figure 2:
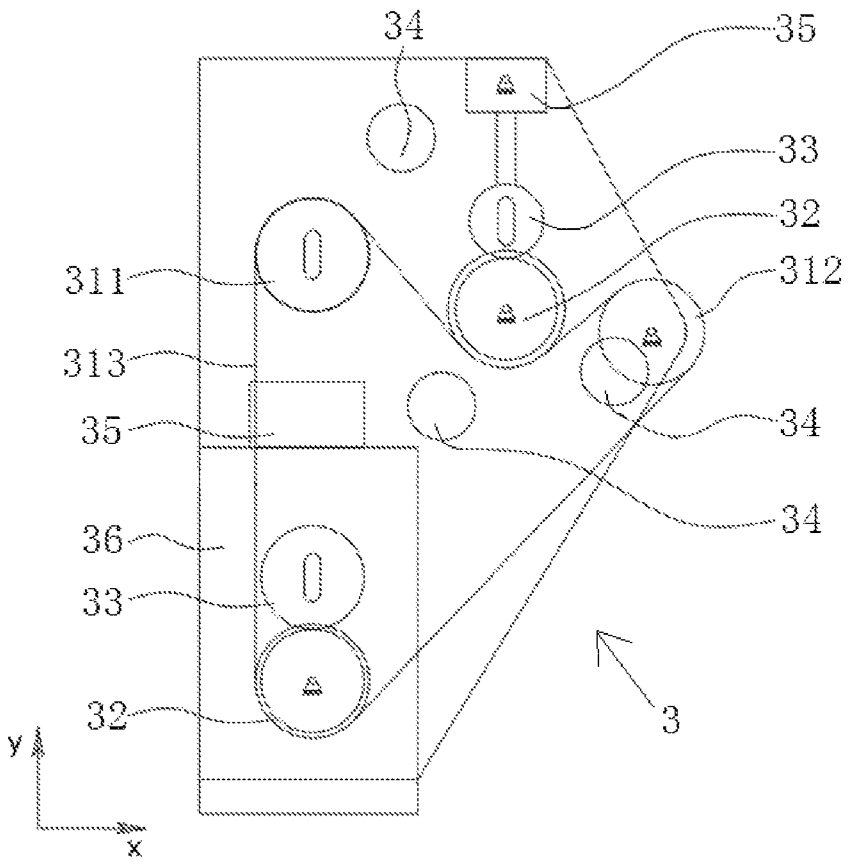
FIG. 2 is a front view of a traction mechanism of the automatic packaging bag production device according to the present disclosure.
Figure 3:
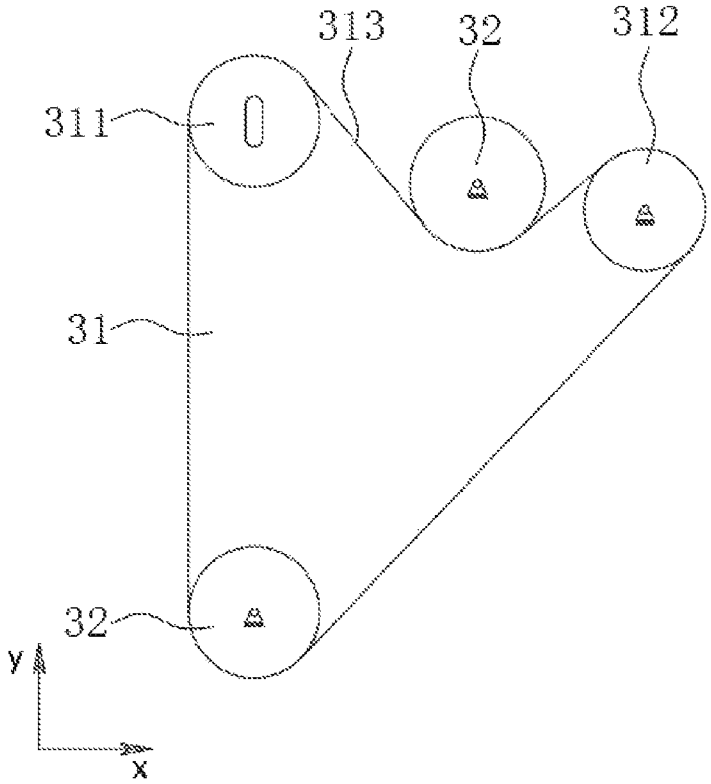
FIG. 3 is a front view of a driving structure of the automatic packaging bag production device according to the present disclosure.

In order to ensure the reliability and stability of the traction mechanism 3, in this embodiment, as shown in FIGS. 1, 2, and 3, the traction mechanism 3 includes driving structure 31, multiple traction wheels 32, and multiple guide wheels 34. The driving structure 31 is configured to drive the traction wheels 32 to rotate. The multiple traction wheels 32 are sequentially arranged along the conveying direction of the belt-shaped material 6. Compression wheel 33 is provided at a side of each of the traction wheels 32. The belt-shaped material 6 passes between the compression wheel 33 and the traction wheel 32. Multiple guide wheels 34 are sequentially arranged along the conveying direction of the belt-shaped material 6, The guide wheels 34 are configured to guide a conveying trajectory of the belt-shaped material 6. Specifically, the driving structure 31 includes driving wheel 311, tensioning wheel 312, and synchronous belt 313. The driving wheel 311, the tensioning wheel 312, and the traction wheels 32 are in transmission connection with the synchronous belt 313. The driving wheel 311 is driven by a servo motor. The compression wheel 33 is driven by fifth driving element 35 to move close to or away from the corresponding traction wheel 32 along the Y-axis.

In order to replace the packaging bag and accommodate packaging bags of different specifications, in this embodiment, as shown in FIG. 1, the automatic packaging bag production device further includes base 51. The base 51 is provided with guide rail 52 along the X-axis. The base 51 is provided with ruler 53 along the guide rail 52. The first base plate 11 and the second base plate 21 are sequentially slidable along the guide rail 52. First handle structure 54 for locking the first base plate 11 is provided between the first base plate 11 and the guide rail 52. Second handle structure 55 for locking the second base plate 21 is provided between the second base plate 21 and the guide rail 52. The traction mechanism 3 further includes third base plate 36. The driving structure 31, the traction wheels 32, and the compression wheels 33 are provided on the third base plate 36. The first base plate 11, the third base plate 36, and the second base plate 21 are sequentially slidable along the guide rail 52. Third handle structure 56 for locking the third base plate 36 is provided between the third base plate 36 and the guide rail 52.

In order to further ensure the reliability and stability of easy-tear line perforation, cutting, and tail sealing operations, in this embodiment, as shown in FIG. 1, the first passage 16, the second passage 223, and the third passage 233 are located on a same horizontal line. At least one pair of the traction wheel 32 and the compression wheel 33 is provided between the easy-tear line forming mechanism 1 and the sealing and cutting mechanism 2.

An automatic packaging bag production method uses the automatic packaging bag production device, and includes the following steps.

S1. As shown in FIG. 1, the traction mechanism 3 pulls the belt-shaped material 6 along the X-axis to pass through the first passage 16, the second passage 223, the third passage 233, and the tray 4 sequentially.

Figure 4:
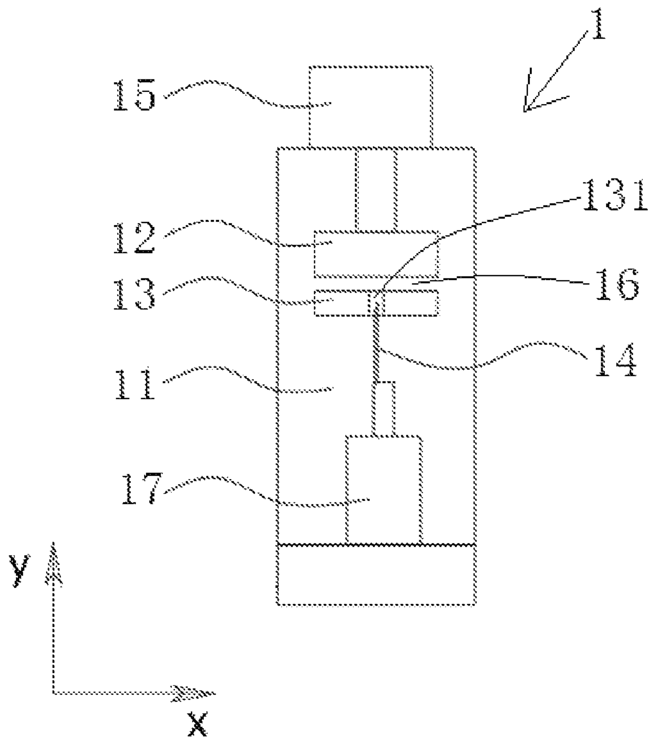
FIG. 4 is a front view of an easy-tear line forming mechanism of the automatic packaging bag production device according to the present disclosure.

S2. As shown in FIGS. 1 and 4, when a perforation position of the belt-shaped material 6 reaches the perforation hole 131, the first driving element 15 drives the pressure plate 12 downwards along the Y-axis, such that the pressure plate moves close to the support plate 13 to close the first passage 16 and compress the belt-shaped material 6. The second driving element 17 drives the perforated cutter 14 upwards through the perforation hole 131, such that the cutter enters the first passage 16 to form an easy-tear line at a corresponding position of the belt-shaped material 6. The second driving element 17 drives the perforated cutter 14 downwards through the perforation hole 131, such that the perforated cutter moves away from the first passage 16. The first driving element 15 drives the pressure plate 12 upwards along the Y-axis, such that the pressure plate moves away from the support plate 13 to open the first passage 16.

Figure 5:
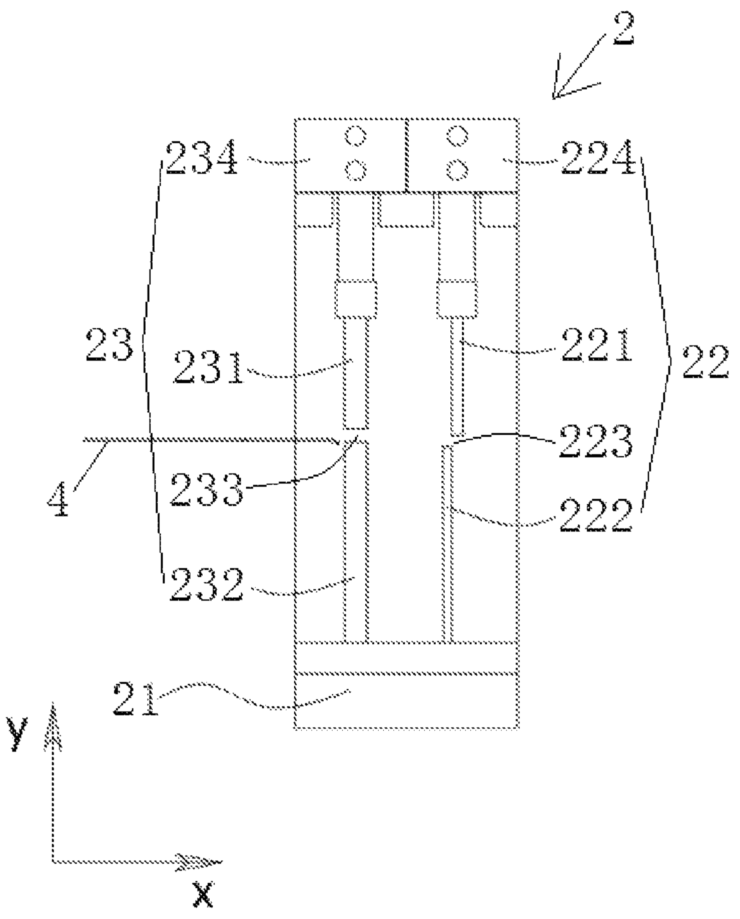
FIG. 5 is a front view of a sealing and cutting mechanism of the automatic packaging bag production device according to the present disclosure.

S3. As shown in FIGS. 1 and 5, the traction mechanism 3 pulls and continuously conveys the belt-shaped material 6 forward. If a set-size packaging bag is possibly formed at a tail end of the belt-shaped material 6, the third driving element 224 drives the upper cutter 221 and the lower cutter 222 to move close to each other along the Y-axis to cut the packaging bag. The cut packaging bag falls onto the tray 4, with a tail end exposed. The third driving element 224 drives the upper cutter 221 and the lower cutter 222 to move away from each other along the Y-axis to open the second passage 223.

S4. As shown in FIGS. 1 and 5, the fourth driving element 234 drives the upper sealer 231 and the lower sealer 232 to move close to each other along the Y-axis to heat-seal the tail end of the packaging bag. The fourth driving element 234 drives the upper sealer 231 and the lower sealer 232 to move away from each other along the Y-axis to open the third passage 233. In this embodiment, the tray 4 conveys the sealed packaging bag to a next process.

Steps S1 to S4 are repeated to achieve automatic and continuous packaging bag production.

In order to significantly improve the automatic production efficiency of packaging bags, in this embodiment, the operation in step S2 that the second driving element 17 drives the perforated cutter 14 to move through the perforation hole 131 into the first passage 16 and the operation in step S3 that the third driving element 224 drives the upper cutter 221 and the lower cutter 222 to move close to each other along the Y-axis to cut the packaging bag can be performed simultaneously.

When it is necessary to replace the specifications of the packaging bag, a distance between the mechanisms, that is, the easy-tear line forming mechanism 1, the traction mechanism 3, and the sealing and cutting mechanism 2 along the guide rail 52 is adjusted such that these mechanisms are appropriately positioned. Then, they are locked by the first handle structure 54, the third handle structure 56, and the second handle structure 55. In this way, the specifications of the packaging bag are replaced, and different specifications of packaging bags can be accommodated.

The above described are merely preferred specific implementations of the present disclosure, and the protection scope of the present disclosure is not limited thereto. Any equivalent substitutions or changes made by those skilled in the art according to the technical solutions and concepts of the present disclosure within the technical scope of the present disclosure should be covered by the protection scope of the present disclosure.

What is claimed is:

1. An automatic packaging bag production device, comprising:

an easy-tear line forming mechanism, comprising a first passage, and configured to form an easy-tear line on a belt-shaped material passing through the first passage;

a sealing and cutting mechanism, comprising a second base plate, and a cutting assembly and a sealing assembly arranged on the second base plate, wherein the cutting assembly comprises an upper cutter and a lower cutter; a second passage is formed between the upper cutter and the lower cutter, and the upper cutter and the lower cutter are driven by a third driving element to move close to or away from each other; the sealing assembly comprises an upper sealer and a lower sealer; and a third passage is formed between the upper sealer and the lower sealer, and the upper sealer and the lower sealer are driven by a fourth driving element to move close to or away from each other;

a tray, wherein the first passage, the second passage, the third passage, and the tray are sequentially arranged; and a traction mechanism, configured to pull the belt-shaped material for a sequence of operations as follows: in the first passage, the easy-tear line forming mechanism forms the easy-tear line on the belt-shaped material; in the second passage, the upper cutter and the lower cutter move close to each other to cut a packaging bag, such that the packaging bag falls onto the tray; and in the third passage, the upper sealer and the lower sealer move close to each other to heat-seal a tail end of the packaging bag.

2. The automatic packaging bag production device according to claim 1, wherein the easy-tear line forming mechanism comprises a first base plate, a pressure plate, a support plate, and a perforated cutter; the support plate is fixedly provided on the first base plate; the pressure plate is driven by a first driving element to move close to or away from the support plate; the first passage is formed between the pressure plate and the support plate; a perforation hole communicated with the first passage runs through the support plate; and the perforated cutter is driven by a second driving element to move into or away from the first passage through the perforation hole.

3. The automatic packaging bag production device according to claim 2, further comprising a base, wherein the base is provided with a guide rail; the first base plate and the second base plate are sequentially slidable along the guide rail; a first handle structure for locking the first base plate is provided between the first base plate and the guide rail; and a second handle structure for locking the second base plate is provided between the second base plate and the guide rail.

4. The automatic packaging bag production device according to claim 3, wherein the base is provided with a ruler along the guide rail.

5. The automatic packaging bag production device according to claim 4, wherein the traction mechanism comprises a driving structure, multiple traction wheels, and multiple guide wheels; the driving structure is configured to drive the traction wheels to rotate; the multiple traction wheels are sequentially arranged along a conveying direction of the belt-shaped material; a compression wheel is provided at a side of each of the traction wheels; the belt-shaped material passes between the compression wheel and the traction wheel; the multiple guide wheels are sequentially arranged along the conveying direction of the belt-shaped material; and the guide wheels are configured to guide a conveying trajectory of the belt-shaped material.

6. The automatic packaging bag production device according to claim 5, wherein the driving structure comprises a driving wheel, a tensioning wheel, and a synchronous belt; the driving wheel, the tensioning wheel, and the traction wheels are in transmission connection with the synchronous belt; the driving wheel is driven by a servo motor; and the compression wheel is driven by a fifth driving element to move close to or away from the corresponding traction wheel.

7. The automatic packaging bag production device according to claim 3, wherein the traction mechanism comprises a driving structure, multiple traction wheels, and multiple guide wheels; the driving structure is configured to drive the traction wheels to rotate; the multiple traction wheels are sequentially arranged along a conveying direction of the belt-shaped material; a compression wheel is provided at a side of each of the traction wheels; the belt-shaped material passes between the compression wheel and the traction wheel; the multiple guide wheels are sequentially arranged along the conveying direction of the belt-shaped material; and the guide wheels are configured to guide a conveying trajectory of the belt-shaped material.

8. The automatic packaging bag production device according to claim 7, wherein the driving structure comprises a driving wheel, a tensioning wheel, and a synchronous belt; the driving wheel, the tensioning wheel, and the traction wheels are in transmission connection with the synchronous belt; the driving wheel is driven by a servo motor; and the compression wheel is driven by a fifth driving element to move close to or away from the corresponding traction wheel.

9. The automatic packaging bag production device according to claim 2, wherein the traction mechanism comprises a driving structure, multiple traction wheels, and multiple guide wheels; the driving structure is configured to drive the traction wheels to rotate; the multiple traction wheels are sequentially arranged along a conveying direction of the belt-shaped material; a compression wheel is provided at a side of each of the traction wheels; the belt-shaped material passes between the compression wheel and the traction wheel; the multiple guide wheels are sequentially arranged along the conveying direction of the belt-shaped material; and the guide wheels are configured to guide a conveying trajectory of the belt-shaped material.

10. The automatic packaging bag production device according to claim 9, wherein the driving structure comprises a driving wheel, a tensioning wheel, and a synchronous belt; the driving wheel, the tensioning wheel, and the traction wheels are in transmission connection with the synchronous belt; the driving wheel is driven by a servo motor; and the compression wheel is driven by a fifth driving element to move close to or away from the corresponding traction wheel.

11. The automatic packaging bag production device according to claim 9, wherein the traction mechanism further comprises a third base plate; the driving structure, the traction wheels, and the compression wheels are provided on the third base plate; the first base plate, the third base plate, and the second base plate are sequentially slidable along the guide rail; and a third handle structure for locking the third base plate is provided between the third base plate and the guide rail.

12. The automatic packaging bag production device according to claim 9, wherein the first passage, the second passage, and the third passage are located on a same horizontal line; and at least one pair of the traction wheel and the compression wheel is provided between the easy-tear line forming mechanism and the sealing and cutting mechanism.

13. An automatic packaging bag production method, using the automatic packaging bag production device according to claim 2, and comprising the following steps:

S1: pulling, by the traction mechanism, the belt-shaped material to pass through the first passage, the second passage, the third passage, and the tray sequentially;

S2: driving, by the first driving element, the pressure plate to move close to the support plate to close the first passage and compress the belt-shaped material, when a perforation position of the belt-shaped material reaches the perforation hole; driving, by the second driving element, the perforated cutter to move into the first passage through the perforation hole to form the easy-tear line at the perforation position of the belt-shaped material; driving, by the second driving element, the perforated cutter to move away from the first passage through the perforation hole; and driving, by the first driving element, the pressure plate to move away from the support plate to open the first passage;

S3: continuously pulling, by the traction mechanism, the belt-shaped material; driving, by the third driving element, the upper cutter and the lower cutter to move close to each other to cut a tail end of the belt-shaped material, such that a set-size packaging bag falls onto the tray, with a tail end exposed; and driving, by the third driving element, the upper cutter and the lower cutter to move away from each other to open the second passage; and S4: driving, by the fourth driving element, the upper sealer and the lower sealer to move close to each other to heat-seal the tail end of the packaging bag; and driving, by the fourth driving element, the upper sealer and the lower sealer to move away from each other to open the third passage.

14. The automatic packaging bag production method according to claim 13, wherein the driving, by the second driving element, the perforated cutter to move into the first passage through the perforation hole in step S2 and the driving, by the third driving element, the upper cutter and the lower cutter to move close to each other to cut the tail end of the belt-shaped material in step S3 are allowed to be performed simultaneously.

15. The automatic packaging bag production method according to claim 13, wherein the automatic packaging bag production device further comprises a base, wherein the base is provided with a guide rail; the first base plate and the second base plate are sequentially slidable along the guide rail; a first handle structure for locking the first base plate is provided between the first base plate and the guide rail; and a second handle structure for locking the second base plate is provided between the second base plate and the guide rail.

16. The automatic packaging bag production method according to claim 15, wherein in the automatic packaging bag production device, the base is provided with a ruler along the guide rail.

17. The automatic packaging bag production method according to claim 13, wherein in the automatic packaging bag production device, the traction mechanism comprises a driving structure, multiple traction wheels, and multiple guide wheels; the driving structure is configured to drive the traction wheels to rotate; the multiple traction wheels are sequentially arranged along a conveying direction of the belt-shaped material; a compression wheel is provided at a side of each of the traction wheels; the belt-shaped material passes between the compression wheel and the traction wheel; the multiple guide wheels are sequentially arranged along the conveying direction of the belt-shaped material; and the guide wheels are configured to guide a conveying trajectory of the belt-shaped material.

18. The automatic packaging bag production method according to claim 17, wherein in the automatic packaging bag production device, the driving structure comprises a driving wheel, a tensioning wheel, and a synchronous belt; the driving wheel, the tensioning wheel; and the traction wheels are in transmission connection with the synchronous belt; the driving wheel is driven by a servo motor; and the compression wheel is driven by a fifth driving element to move close to or away from the corresponding traction wheel.

19. The automatic packaging bag production method according to claim 17, wherein in the automatic packaging bag production device, the traction mechanism further comprises a third base plate; the driving structure, the traction wheels, and the compression wheels are provided on the third base plate; the first base plate, the third base plate, and the second base plate are sequentially slidable along the guide rail; and a third handle structure for locking the third base plate is provided between the third base plate and the guide rail.

20. The automatic packaging bag production method according to claim 17, wherein in the automatic packaging bag production device, the first passage, the second passage, and the third passage are located on a same horizontal line; and at least one pair of the traction wheel and the compression wheel is provided between the easy-tear line forming mechanism and the sealing and cutting mechanism.

* * * * *